United States Patent Office 3,639,458
Patented Feb. 1, 1972

---

3,639,458
CATALYTIC OXIDATIVE DEHYDROGENATION OF ESTERS
Robert W. Etherington, Pennington, and Koei-Liang Liauw, Clark, N.J., assignors to Mobil Oil Corporation
No Drawing. Filed Mar. 22, 1968, Ser. No. 715,188
Int. Cl. C07c 69/54
U.S. Cl. 260—486 D                  6 Claims

ABSTRACT OF THE DISCLOSURE

Esters having at least one pair of hydrogen atoms on the alpha and beta carbon atoms of the acid portion are oxidatively dehydrogenated to the corresponding ethylenically unsaturated ester by contacting the ester and molecular oxygen-containing gas with a catalyst containing gold metal in the vapor phase (400–750° C.). The gold may be on a support. The unsaturated ester products can be polymerized and copolymerized to thermoplastic polymers useful for making extruded or molded shapes.

BACKGROUND OF THE INVENTION

Field of the invention

This invention relates to oxidative dehydrogenation. It is more particularly concerned with selective catalytic oxidative dehydrogenation of esters to unsaturated esters.

DESCRIPTION OF THE PRIOR ART

As is well known to those familiar with the art, various synthesis routes have been proposed for the production of unsaturated esters, notably methyl acrylate and methyl methacrylate. Methyl methacrylate has been prepared by dehydrogenating methyl isobutyrate using activated alumina catalyst (U.S. 2,945,057). Catalyst activity is improved by addition of 1–10% vanadium oxide or calcium oxide. Insofar as is now known, however, it has not been proposed to produce an unsaturated ester by the oxidative dehydrogenation of the corresponding saturated ester in contact with gold metal.

SUMMARY OF THE INVENTION

It is the discovery of this invention that unsaturated esters can be prepared by selective dehydrogenation. This invention provides a method for producing an unsaturated ester that comprises contacting a saturated ester reactant and a molecular oxygen-containing gas, in the vapor phase with a catalyst comprising gold metal.

DESCRIPTION OF SPECIFIC EMBODIMENTS

The ester reactant used in the process of this invention is a methyl ester of a $C_3$–$C_5$ alkanoic acid having one pair of alpha and beta carbon atoms with at least one hydrogen atom on each. The acid portion can be straight chain or branched chain. Examples of the ester reactant are methyl propionate, methyl n-butyrate, methyl isobutyrate, methyl valerate, and methyl isovalerate.

In the process of this invention, the molar ratio of molecular oxygen to ester reactant can be between 0.2 and 3, but preferably it is between 0.3 and 2. Pure oxygen can be used, but generally mixtures containing molecular oxygen are used, such as air, mixtures of air and oxygen, and mixtures of oxygen with nitrogen.

The catalyst utilized in the process of this invention comprises gold metal. It can be in the form of wire, gauze, pellets, or coating on a support. The gold can be alloyed with other metals. The catalyst supports can be any inert refractory material such as alumina and silicon carbide. When supported, the amount of catalytic metal in the catalyst can vary widely between about 0.5% and about 50% or more, by weight.

The oxidative dehydrogenation reaction of this invention is carried out in the vapor phase at temperatures varying between about 300° C. and about 750° C., preferably between about 400° C. and about 700° C. The contact time of ester reactant with the catalyst can be between about 0.001 sec. and about 20 sec. In the preferred continuous operation, ester reactant is charged at a LHSV (volume liquid charge per volume catalyst per hour) of 0.1 to 20.

Any vessel suitable for carrying out exothermic vapor phase reactions is utilizable herein. The process can be carried out batchwise but it is more suitably carried out in a continuous process. In such operation, unreacted ester reactant can be recycled to extinction, after separation from the product.

EXAMPLE 1

A reactor constructed of ¾" I.D. x 16¾" stainless steel tube containing a concentric ¼" stainless steel thermocouple well, in a vertical position, was filled with 70 cc. of ⅛" x ⅛" alundum followed by 60 cc. of catalyst consisting of 10% gold deposited on 3/16" spheres of alumina. The reactor was heated with an electric tube furnace.

Methyl isobutyrate was pumped at the rate of 1 ml./min. (LHSV=1) through a heated transfer line functioning as a vaporizer to the top of the reactor where it was mixed with air being fed at the rate of 600 std. cc./min. The mixture of gases then passed through the heated catalyst bed. The maximum temperature of catalyst bed was 566° C. The product was condensed in a series of condensers. The organic product contained 4.0% methyl methacrylate and 96% unreacted methyl isobutyrate.

EXAMPLE 2

A reactor similar to that of Example 1 was filled with 110 cc. of catalyst consisting of 10% gold deposited on 3/16" spheres of alumina. Methyl propionate fed at 1.1 ml./min. (LHSV=0.6) and air fed at 700 std. cc./min. were preheated, mixed, and then passed through the reactor. The maximum temperature of the catalyst bed was 480° C. The organic product contained 1% methyl acrylate and 98% unreacted methyl propionate.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing an unsaturated ester that comprises contacting, in the vapor phase, a molecular oxygen-containing gas and a methyl ester of an alkanoic acid having 3–5 carbon and having at least one pair of alpha and beta carbon atoms with at least one hydrogen on each using a molar ratio of molecular oxygen to ester between 0.2 and 3, with a catalyst comprising gold metal at a temperature between about 300° C. and about 750° C. and for a contact time of ester with catalyst between about 0.001 second and about 20 seconds.

2. The process defined in claim 1, wherein said catalyst is 0.5–50 weight percent gold on an inert refractory support.

3. The process defined in claim 1, wherein said ester is methyl isobutyrate.

4. The process defined in claim 3, wherein said catalyst is 0.5–50 weight percent gold on alumina.

5. The process defined in claim 1, wherein said ester is methyl propionate.

6. The process defined in claim 5, wherein said catalyst is 0.5–50 weight percent gold on alumina.

References Cited

UNITED STATES PATENTS 3,075,001  1/1963  Godfrey _____ 260—486

LEWIS GOTTS, Primary Examiner

P. J. KILLOS, Assistant Examiner